United States Patent [19]
Rink et al.

[11] Patent Number: 5,635,590
[45] Date of Patent: Jun. 3, 1997

[54] PROCESS AND POLYCONDENSATION APPARATUS FOR THE TREATMENT OF CONTAMINATED ETHYLENE GLYCOL

[75] Inventors: Jürgen Rink, Hattingen; Klaus Stemmer, Ratingen; Rudolf Geier, Essen, all of Germany

[73] Assignee: John Brown Deutsche Engineering GmbH, Essen, Germany

[21] Appl. No.: 505,239

[22] PCT Filed: Feb. 25, 1994

[86] PCT No.: PCT/DE94/00194

§ 371 Date: Aug. 10, 1995

§ 102(e) Date: Aug. 10, 1995

[87] PCT Pub. No.: WO94/19389

PCT Pub. Date: Sep. 1, 1994

[30] Foreign Application Priority Data

Feb. 27, 1993 [DE] Germany .................. 43 06 144.3

[51] Int. Cl.$^6$ .................................................. C08F 6/00
[52] U.S. Cl. .................. 528/500; 528/272; 528/308.6; 528/503; 203/18; 203/73; 203/75; 203/82
[58] Field of Search ................. 528/272, 308.6, 528/500, 503; 203/18, 73, 75, 82

[56] References Cited

U.S. PATENT DOCUMENTS

| 3,878,055 | 4/1975 | Cox et al. ........................ 203/37 |
| 4,110,316 | 8/1978 | Edging et al. ..................... 526/68 |

FOREIGN PATENT DOCUMENTS

| 0 240 279 | 10/1987 | European Pat. Off. . |
| 2 386 572 | 11/1978 | France . |
| 124 053 | 2/1977 | German Dem. Rep. . |
| 24 51 176 | 5/1975 | Germany . |
| 2 184 129 | 6/1987 | United Kingdom . |

*Primary Examiner*—Samuel A. Acquah
*Attorney, Agent, or Firm*—Herbert Dubno

[57] ABSTRACT

The invention relates to a process for the treatment of contaminated ethylene glycol resulting during a polycondensation process for the production of polyester. In the course of this polycondensation process contaminated ethylene glycol is continuously predistilled, subjected as a distillation residue to secondary distillation, condensed and then returned to the polycondensation process as decontaminated ethylene glycol, so that an in-line recovery is achieved, which makes superfluous an external distillation installation for the treatment of contaminated ethylene glycol.

3 Claims, 1 Drawing Sheet

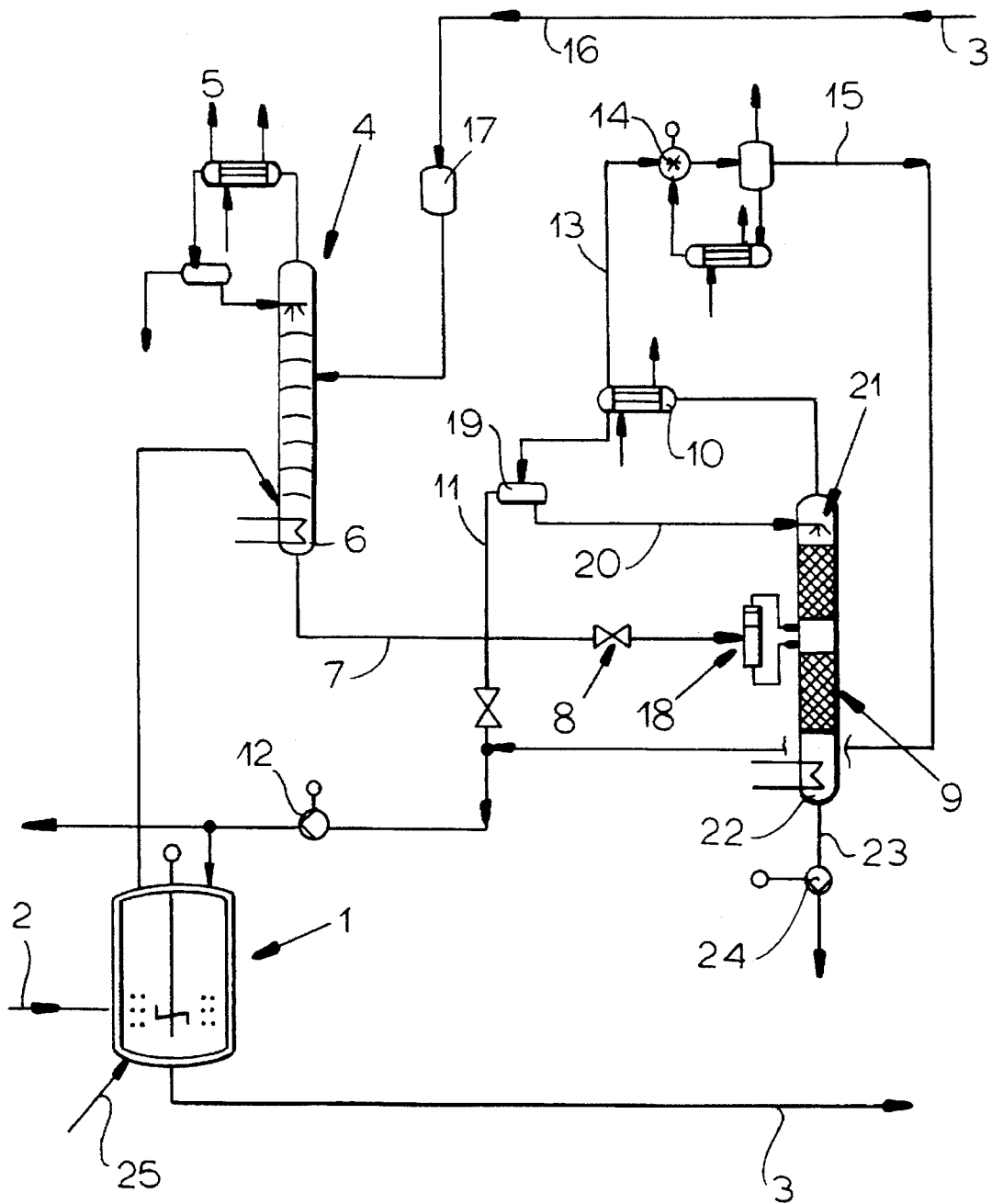

PROCESS AND POLYCONDENSATION APPARATUS FOR THE TREATMENT OF CONTAMINATED ETHYLENE GLYCOL

The invention relates to a process for the treatment of contaminated ethylene glycol which results during a polycondensation process for the production of polyester, wherein the contaminated ethylene glycol is subjected to preliminary distillation for separation of water and the low-boiling fractions, then as a distillation residue is subjected to secondary distillation and the ethylene glycol resulting as a distillate is condensed.

During the polycondensation process for the production of polyester contaminated ethylene glycol results. So for instance a ethylene glycol/water mixtures is formed in the esterification stage, during the esterification of terephthalic acid with ethylene glycol, forming polyester. This ethylene glycol/water mixture is fed to a preliminary distillation column, in order to eliminate water and other low-boiling fractions by distillation over the top of the preliminary distillation column and to condense them in a subsequently arranged condenser. For the treatment of the contaminated ethylene glycol and consequently the recovery of the same ethylene glycol, the bottom product, respectively the distillation residue which consists of ethylene glycol, diethylene glycol and other secondary products, have to be directed to an off-line distillation apparatus, which consequently is not a part of the polycondensation installation. Such an off-line distillation apparatus is expensive from the point of view of plant technology, requires in addition considerable investments and is also disadvantageous from the point of view of space and service personnel requirements. In addition thereto the contaminated ethylene glycol resulting during the polycondensation stage from the cycles of the spray condensers and vacuum pumps, as well as when the polycondensation apparatus is started and closed down, has also to be fed to the off-line distillation apparatus, and as a consequence has to be decontaminated in the course of an interrupted treatment process. The known treatment of contaminated ethylene glycol is unsatisfactory as a whole, from the point of view of process technology as well as plant engineering.

It is the object of the invention to indicate a treatment process of the above-described type, according to which the contaminated ethylene glycol resulting during a polycondensation process can be perfectly decontaminated in a rational, functionally safe and technologically simple way.

The invention solves this problem in the case of a generic process due to the fact that during the polycondensation process the contaminated ethylene glycol is continuously predistilled, then subjected to secondary distillation as a distillation residue, preferably under vacuum, then condensed and again fed to the polycondensation process, respectively its consumers, as decontaminated ethylene glycol. According to the teaching of the invention an in-line vacuum distillation of the entire contaminated ethylene glycol resulting from the polycondensation process takes place. Indeed the ethylene glycol recovery is integrated into the polycondensation process, namely by combining distillation process and treatment tasks. This way an external ethylene glycol recovery becomes superfluous. The ethylene glycol treatment of the invention leads to a particularly good cleansing, so that the decontaminated ethylene glycol is particularly suitable for use in polycondensation installations for producing high-quality polyester products, such as granulate for the production of microfibers, foils, films and bottles. In fact the quality of fresh glycol is reached. In this connection it is particularly important that the secondary distillation take place in vacuum, so that the usually high thermal oxidative load of the glycol is eliminated and an optimal product quality is achieved, namely the quality of fresh glycol. This way savings of fresh glycol are generated.

Further steps which are essential to the invention are mentioned in the following. So for instance the invention provides that the ethylene glycol/water mixture resulting in the esterification stage or stages during the esterification of terephthalic acid with ethylene glycol to form polyester and the contaminated ethylene glycol resulting during the polycondensation process from the cycles of the spray condensers and vacuum pumps be continuously treated to become decontaminated ethylene glycol, which means it is subjected to preliminary distillation, that the distillation residue be subjected to secondary distillation under vacuum, the decontaminated ethylene glycol be condensed as a distillate and the recovered ethylene glycol be fed again to the polycondensation process, respectively to its consumers. Consequently a continuous recovery is achieved also with respect to the contaminated ethylene glycol resulting during the polycondensation stage. However, according to the invention also the contaminated ethylene glycol resulting from the starting, shutdown and cleaning processes of the polycondensation apparatus, after a temporary storage, is continuously fed to the continuous ethylene glycol recovery process, for instance is introduced in the esterification reactor. During the start, shut-off (cut-off) and cleaning of the polycondensation apparatus the so-called cleaning glycol is formed, which is actually also contaminated ethylene glycol. As a result the treatment of the entire amount of ethylene glycol used and eventually contaminated in the polycondensation apparatus is achieved.

The object of the invention is also a polycondensation installation for the production of polyester, with at least one esterification reactor and a subsequently arranged preliminary distillation column with condenser for the preliminary distillation of the contaminated ethylene glycol. This polycondensation installation which as a rule has two esterification stages and one polycondensation stage is characterized in that down from the bottom of the preliminary distillation column a transfer line for the distillation residue with a pressure-reducing device, e.g. a pressure-relief valve, leads to a secondary distillation column, that at the top of the secondary distillation column a condenser for the decontaminated ethylene glycol as a distillate is connected, that to the condenser on the one hand a return line with a feed pump for decontaminated ethylene glycol, leading to the various consumers and on the other hand vacuum line with a vacuum pump for producing a vacuum in the secondary distillation column are connected, whereby from the pressure side of the vacuum pump a pressure line arranged before the feed pump, considered in feeding direction, leads to the return line under conditions of pressure balancing. These steps taken according to the invention make it possible to eliminate the off-line, therefore external, distillation installation. Furthermore a continuously operating recovery system is created which is integrated in the actual polycondensation installation, which reduces considerably the investment, the building, personnel and energy expenses. Energy is saved already because the polycondensation apparatus of the invention does not require a special heating of the distillation column, which is necessary in an external distillation column during the recovery of ethylene glycol. Besides an in-line installation is environmentally friendlier than an off-line installation. Suitably to the preliminary distillation column a supply line coming from the spray condensers and the vacuum pumps of the subsequently arranged polycondensation stage is connected via an intermediate container, which performs the function of a buffer, so that also the contaminated ethylene glycol resulting during the polycondensation stage can be continuously recovered, without the assistance of external recovery systems. By means of the installed intermediate container it is possible to avoid load variations of the preliminary distillation column. As a precautionary measure the transfer line for the bottom product of the preliminary distillation column, respectively the distillation residue consisting of ethylene glycol, diethylene glycol and other secondary products has a pressure-relaxation tank, so that in the secondary distillation column it is indeed possible to work with vacuum, respectively with sufficient negative pressure, while in the preliminary distillation column it is possible to work with the usual operational pressure. In order to optimize the cleansing of the ethylene glycol in the secondary distillation column, the invention further advises that between the condenser for the decontaminated ethylene glycol and the feed pump a reflux container be inserted in the return line and that from the reflux container a reflux line be provided which leads to the upper end of the secondary distillation column, where a distribution device for the decontaminated ethylene glycol supplied by way of reflux is located. In fact a better separation of the ethylene glycol from the low-boiling fraction is achieved this way. For this merely the reflux of a small amount of decontaminated ethylene glycol is sufficient. At the bottom of the secondary distillation column preferably an evacuation line with a feed pump for the low-boiling fraction is connected, so that the low-boiling fraction remaining at the bottom of the secondary distillation column can be evacuated and released for disposal by the operator of the installation. This way a careful separation of the low-boiling fraction—basically diethylene glycol and other secondary products—is achieved. Further a supply line coming from the storage container for contaminated ethylene glycol can open into the esterification reactor, as a rule into the second esterification reactor of the esterification stage. This because this storage container serves for receiving the contaminated ethylene glycol resulting during the start, the shut-off and the cleaning of the polycondensation installation.

As a result the total amount of ethylene glycol circulating through the polycondensation process is decontaminated without external treatment and can be reused just like fresh glycol. Thereby the entire polycondensation process is more economically structured. By limiting the thermal-oxidative load of the decontaminated ethylene glycol through the secondary distillation in vacuum, the specification of pure, respectively fresh glycol is achieved in the course of an in-line distillation.

The invention is closer described in the following with the aid of a drawing illustrating one embodiment example. The sole FIGURE shows the part of a polycondensation apparatus equipped for the continuous treatment of contaminated ethylene glycol.

The part of a polycondensation installation for the production of polyester shown in the FIG. 1 illustrates an esterification reactor 1 of upstream esterification stage 2 not shown in the drawing, followed by the polycondensation stage 3 also not shown in the drawing. Downstream of the esterification reactor 1 a preliminary distillation column 4 with condenser 5 is arranged. In the preliminary distillation column 4 water and low-boiling fractions are separated through distillation from an ethylene glycol/water mixture, condensed in condenser 5 and released into the atmosphere, respectively discharged into the waste water treatment system. From the sump, respectively bottom 6 of the preliminary distillation column 4 a transfer line 7 for the distillation residue of ethylene glycol, diethylene glycol and other secondary products, provided with a pressure-reduction device 8, which is merely indicated in the drawing, e.g. a pressure-relief valve, leads to a secondary distillation column 9. To the top of this secondary distillation column a condenser 10 for the distillate, consequently for the decontaminated ethylene glycol is connected. To the condenser 10, on the one hand a return line 11 with a feed pump 12 for decontaminated ethylene glycol leading to the various consumers of the polycondensation installation and, on the other hand, a vacuum line 13 with a vacuum pump 14 for creating a vacuum in the secondary distillation column 9 are connected. From the pressure side of the vacuum pump 14 a pressure line 15 arranged in feeding direction before the feed pump 12 leads to the return line 11 under conditions of pressure balancing. Thereby the decontaminated ethylene glycol aspired by the vacuum pump 14 is fed to the return line 11 for the rest of the decontaminated ethylene glycol.

A supply line 16 with an intermediate container 17, coming from the spray condenser and vacuum pumps of the downstream arranged polycondensation stage 3, is connected to the preliminary distillation column 4. Thus this supply line 16 serves for feeding of decontaminated ethylene glycol resulting during the polycondensation stage 3. For there nonprecipitated vapors lead to an enrichment of the contaminated ethylene glycol in the vacuum pumps, which again is required for the polycondensation stage 3 performed in vacuum.

As a precautionary measure, in the transfer line 7 between the preliminary distillation column 4 and the secondary distillation column 9, a pressure-relaxation tank 18 is inserted, in order to insure with certainty the required pressure reduction between preliminary distillation column 4 and the secondary distillation column 9. Between the condenser 10 for the decontaminated ethylene glycol and the feed pump 12 a reflux container 19 is inserted in the return line 11. From this reflux container 19 leads a reflux line 20 to the upper end of the secondary distillation column 9, which has a spraying device 21 for the decontaminated ethylene glycol. So far merely a small amount of the decontaminated ethylene glycol is supplied to the secondary distillation column 9 by way of the reflux, in order to enhance the cleansing effect in there. An evacuation line 23 with a feed pump 24 for the high-boiling fractions is connected to the bottom 22 of the secondary distillation column 9.

Into the esterification reactor 1 leads a supply line 25 coming from a storage container, for contaminated ethylene glycol resulted during the start, shut-off and cleaning of the polycondensation installation.

We claim:

1. Process for the treatment of contaminated ethylene glycol resulting from a polycondensation process for the production of polyester, according to which contaminated ethylene glycol is subjected to preliminary distillation for separation from water and low-boiling fractions, as a distillation residue is subjected to secondary distillation and the ethylene glycol as a distillate is condensed, characterized in that in the course of the polycondensation process contaminated ethylene glycol is continuously subjected to preliminary distillation, subjected to secondary distillation as a distillation residue, under vacuum, condensed and as decontaminated ethylene glycol resupplied to the polycondensation process.

2. Process according to claim 1, characterized in that the ethylene glycol/water mixture resulting from the esterification stage or stages of terephthalic acid with ethylene glycol to form polyester and the contaminated ethylene glycol resulting from the cycles of the spray condensers and vacuum pumps are continuously treated during the polycondensation process to become decontaminated ethylene glycol, by way of preliminary distillation, secondary distillation in vacuum and condensation.

3. Process according to claim 1, characterized in that the contaminated ethylene glycol resulting from the start, shut-off and cleaning processes of the polycondensation installation, after a temporary storage, is continuously reintroduced to the continuous ethylene glycol recovery process.

* * * * *